US011319030B2

(12) United States Patent
Lindblade et al.

(10) Patent No.: US 11,319,030 B2
(45) Date of Patent: *May 3, 2022

(54) IN SITU TURRET BEARING REMEDIATION AND ASSEMBLY

(71) Applicant: SOFEC, INC., Houston, TX (US)

(72) Inventors: Stephen P. Lindblade, Waller, TX (US); Miles A. Hobdy, Richmond, TX (US); William L. Fontenot, Houston, TX (US); David M. Seaman, Waller, TX (US); Patrick R. Thornberry, Katy, TX (US)

(73) Assignee: SOFEC, INC., Houston, TX (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/745,917

(22) Filed: Jan. 17, 2020

(65) Prior Publication Data

US 2020/0148308 A1 May 14, 2020

Related U.S. Application Data

(63) Continuation of application No. 15/813,981, filed on Nov. 15, 2017, now Pat. No. 10,538,291.

(51) Int. Cl.
*B63B 21/50* (2006.01)
*F16C 35/06* (2006.01)
(Continued)

(52) U.S. Cl.
CPC .......... *B63B 21/507* (2013.01); *F16C 19/381* (2013.01); *F16C 23/06* (2013.01);
(Continued)

(58) Field of Classification Search
CPC . B63B 21/50; B63B 2021/501; B63B 21/507; B63B 21/508; B63B 35/44;
(Continued)

(56) References Cited

U.S. PATENT DOCUMENTS

| 5,356,321 A | 10/1994 | Boatman et al. |
| 5,359,957 A * | 11/1994 | Askestad ............... B63B 21/507 |
| | | 114/230.12 |

(Continued)

FOREIGN PATENT DOCUMENTS

| EP | 1889779 | 3/2009 |
| KR | 101370663 | 3/2014 |

(Continued)

OTHER PUBLICATIONS

International Search Report and Written Opinion for International Application PCT/US2018/043565 dated Oct. 29, 2018.

(Continued)

*Primary Examiner* — Ajay Vasudeva
(74) *Attorney, Agent, or Firm* — Edmonds & Cmaidalka, P.C.

(57) ABSTRACT

In a three row, roller bearing assembly coupling a vessel to a turret, the bearing assembly having a support row assembly disposed between an inner ring connected to the turret and outer rings connected to the vessel, a method and arrangement for in situ remediation of a damaged support row assembly. Couplers are secured to existing inner ring stud bolts. A continuous bearing ring below the couplers is assembled and a support bearing arrangement is installed between the couplers and the bearing ring. Reaction plates are mounted to the vessel. Each reaction plate has a jack screw which is positioned directly below the bearing ring. The jack screws are turned to elevate the bearing ring and form a flat surface for support of the support bearing arrangement. The turret axial load is transferred from the damaged support row assembly to the support bearing arrangement.

20 Claims, 8 Drawing Sheets

(51) Int. Cl.
*F16C 19/38* (2006.01)
*F16C 23/06* (2006.01)

(52) U.S. Cl.
CPC .......... *F16C 35/06* (2013.01); *F16C 2300/14* (2013.01); *F16C 2326/30* (2013.01)

(58) Field of Classification Search
CPC . B63B 35/4406; B63B 35/4413; F16C 19/38; F16C 19/381; F16C 23/00; F16C 23/02; F16C 23/06; F16C 25/00; F16C 25/02; F16C 25/06; F16C 35/00; F16C 35/02; F16C 35/04; F16C 35/06; F16C 2300/14; F16C 2326/30
See application file for complete search history.

(56) References Cited

U.S. PATENT DOCUMENTS

| | | | |
|---|---|---|---|
| 5,372,531 A | 12/1994 | Boatman et al. | |
| 5,515,804 A | 5/1996 | Pollack | |
| 5,746,148 A | 5/1998 | Delago | |
| 5,860,382 A | 1/1999 | Hobdy | |
| 5,893,784 A | 4/1999 | Boatman | |
| 6,263,822 B1 | 7/2001 | Fontenot et al. | |
| 6,315,625 B1 | 11/2001 | Braud | |
| 6,474,252 B1 | 11/2002 | Delago | |
| 6,477,974 B2 | 11/2002 | Hobdy | |
| 6,990,917 B2 | 1/2006 | Boatman et al. | |
| 7,063,032 B2 | 6/2006 | Lindblade et al. | |
| 7,347,156 B2 | 3/2008 | Lindblade | |
| 7,451,718 B2 | 11/2008 | Boatman et al. | |
| 8,002,472 B2 | 8/2011 | Craig et al. | |
| 8,197,293 B2 | 6/2012 | Gooijer et al. | |
| 8,671,864 B2 | 3/2014 | Lindblade et al. | |
| 8,770,128 B2 | 7/2014 | Dupont et al. | |
| 8,950,349 B2 * | 2/2015 | Lindblade | F16C 19/545 114/230.12 |
| 9,334,902 B2 | 5/2016 | Hooper | |
| 9,388,850 B2 | 7/2016 | Ottolini et al. | |
| 9,605,709 B2 | 3/2017 | Kaesler et al. | |
| 10,046,834 B1 | 8/2018 | Lindblade et al. | |
| 10,183,727 B1 | 1/2019 | Lindblade et al. | |
| 10,538,291 B2 * | 1/2020 | Lindblade | F16C 35/06 |
| 10,760,612 B1 * | 9/2020 | Slob | B66C 23/52 |
| 2010/0012010 A1 | 1/2010 | Gooijer et al. | |
| 2015/0260219 A1 | 9/2015 | Ottolini et al. | |
| 2017/0120994 A1 | 5/2017 | Berle et al. | |

FOREIGN PATENT DOCUMENTS

| | | |
|---|---|---|
| WO | 2011036406 | 3/2011 |
| WO | 2017179986 | 10/2017 |

OTHER PUBLICATIONS

International Search Report and Written Opinion for International Application PCT/US2018/054222 dated Feb. 11, 2019.

* cited by examiner

IN SITU TURRET BEARING REMEDIATION AND ASSEMBLY

CROSS-REFERENCE TO RELATED APPLICATION

This application is a continuation of co-pending U.S. patent application Ser. No. 15/813,981, filed on Nov. 15, 2017, which is incorporated by reference herein.

BACKGROUND OF THE INVENTION

1. Field of the Invention

This invention relates to a turret structure for vessels such as offshore drilling or production vessels, and more particularly to a turret bearing assembly and bearing repair procedure that can be performed in situ.

2. Description of the Related Art

Vessel mooring systems are known in the art in which a vessel may weathervane about a turret that is moored to the sea floor. The turret extends through a moon pool or cylindrical opening that extends through the hull of the vessel. The vessel is supported for rotation with respect to the turret by turret bearing structures placed between the turret and the vessel. Horizontal and vertical bearings transfer horizontal and vertical loads between the turret and the vessel.

U.S. Pat. No. 8,671,864, issued on Mar. 18, 2014, in the names of Lindblade et al., discloses such a turret mooring system. FIG. 1 of the '864 patent discloses a bow of a vessel having a moon pool extending through the vessel hull. Mounted within the moon pool is a turret about which the vessel weather vanes. The moon pool is normally of a circular cross-section, and the turret is typically of a cylindrical shape to fit within the moon pool. Anchor legs are connected to the turret and secured to the sea bed by suitable anchors to restrict rotation of the turret. Risers extend from subsea wellheads or distribution facilities on the sea floor and are connected to the turret. A manifold deck is supported on the upper end of the turret and includes valves connected to the risers. A swivel stack extends upwardly from the turret and manifold deck, and allows fluids to be transferred from the turret to the vessel. The turret is supported on the vessel by a turret bearing assembly.

One type of turret bearing assembly commonly used is an integrated three-row roller bearing assembly as shown and described in U.S. Pat. No. 5,893,784, issued on Apr. 13, 1999, to Boatman. The three-row roller bearing assembly includes a circular array of support rollers radially aligned about the turret for supporting the turret weight. Any uplifting turret force is resisted by a second set of radially aligned rollers. A third set of rollers, coaxially aligned about the turret, serves to transfer radial loads between the vessel and the turret. The three bearing rows of the three-row roller bearing assembly are preferably lubricated and sealed within a common volume by seals to provide protection from the elements and prevent corrosion. The integrated three-row roller bearing assembly is a precise assembly that requires a high degree of flatness for proper load distribution and is somewhat intolerant of distortions and deflections, which cause high point loading stresses on select rollers.

Most three-row roller bearing assemblies on turret systems located offshore are not replaceable or repairable in situ due to factors such as the size, weight and access to the various components. Although these bearing assemblies are designed for the life of the system, if they fail or exhibit problems, no design or method exists to correct major problems on location. Since large vertical loads are always on the bearing support row, this is where wear problems are most likely to occur.

U.S. Pat. No. 8,197,293, assigned to Bluewater Energy Services B.V., discloses initially installing a secondary bearing assembly in place and loading the secondary bearing assembly when the primary bearing assembly no longer functions. One drawback to this is that including two bearing assemblies (one as a spare) is cost prohibitive and adversely affects capital expense.

It would be desirable to be able to replace or repair a damaged turret three-row roller bearing assembly in situ. It would also be desirable to be able to replace or repair a damaged turret three-row roller bearing assembly while the vessel stays on station. It would be desirable to be able to remove the large vertical load from the existing bearing support row and allow the vessel to stay on station. It would be desirable to be able to provide a new vertical load path in situ while allowing the vessel to weather vane about the turret.

SUMMARY OF THE INVENTION

The invention provides a repair to a turret bearing assembly with damaged support row rollers and/or support race. The repair can be performed and assembled in situ offshore and transfers the load off the main turret bearing's support race and onto a new replacement race in a single lift sequence, thereby simplifying the operation and minimizing the timeframe to perform the load transfer. Additionally, the arrangement removes the need to uninstall the vessel from its offshore location to perform remedial work on the damaged bearing assembly, thereby relieving the vessel's owner of considerable risk and cost implications.

An aspect of the invention is removing axial load from an in place damaged three-row roller bearing assembly and allowing the vessel to continue to weather vane in either a free-state or with assistance. The invention removes load from the existing bearing support row and transfers it to a remedial bearing support row. Radial load will continue to be transferred through the main bearing.

BRIEF DESCRIPTION OF THE SEVERAL VIEWS OF THE DRAWINGS

The invention is better understood by reading the detailed description of embodiments which follow and by examining the accompanying drawings, in which.

DESCRIPTION OF THE PREFERRED EMBODIMENTS

Figure 1:
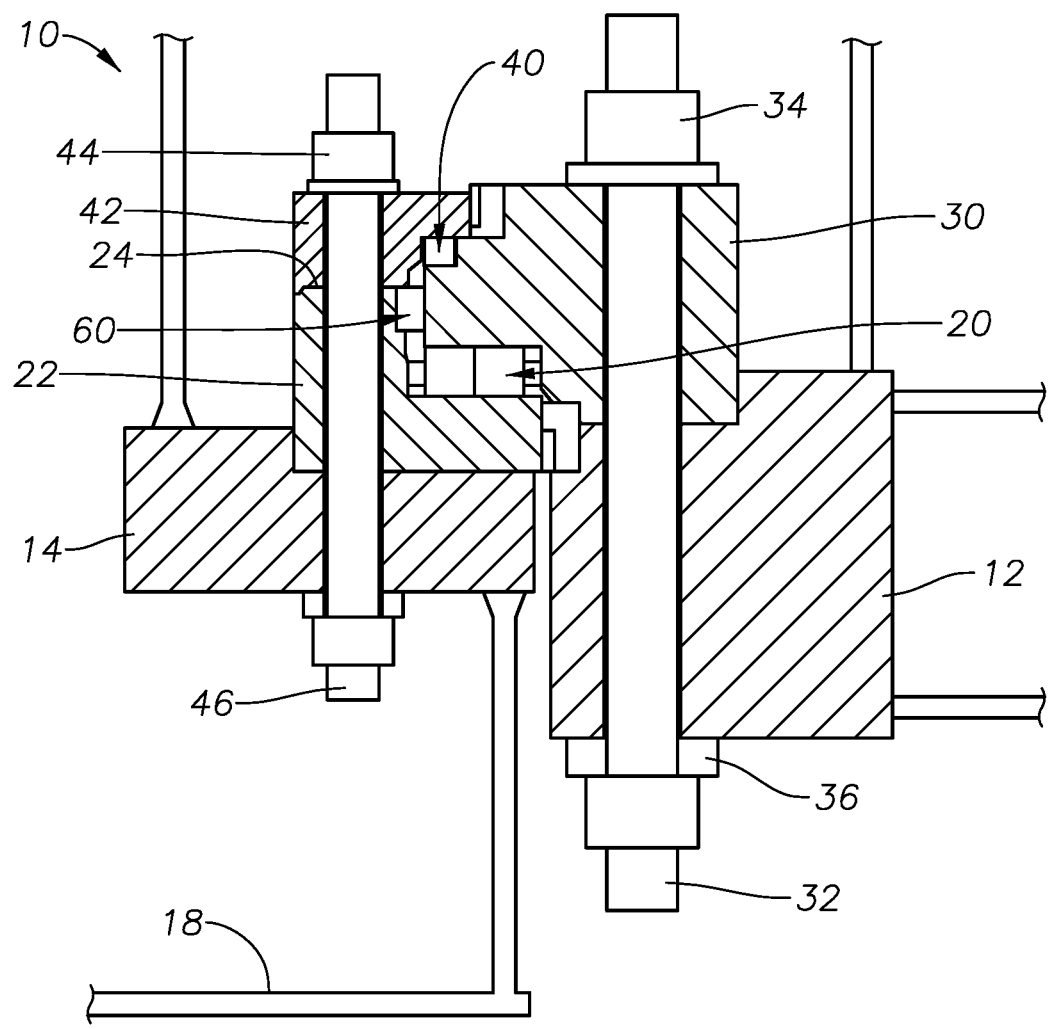
FIG. 1 is a partial elevation view in cross-section of a prior art integrated three-row roller bearing assembly for rotatively coupling a turret within a moon pool of a vessel, showing upper and lower arrangements of radially aligned rollers for transferring axial forces and a mid co-axial arrangement of rollers for transferring radial loads all collocated within a single sealed, lubricated volume.

FIG. 1 depicts a cross-sectional view of a typical three race roller bearing assembly 10 presently found in use on many turret systems. In this system, the turret has a single three race roller bearing assembly 10 installed to react all loading acting between the turret and turret supporting structure 14 of a floating vessel. It is to be understood that the turret supporting structure 14 is part of the floating vessel and has no movement relative to the floating vessel. The turret, represented by turret structure 12, is geostationary and the floating vessel (including the turret supporting structure 14) is allowed to weather vane about the geostationary turret. The bearing assembly 10 is the only means of load transfer across this rotational interface for an external turret, or an internal turret without a lower bearing.

The three-row roller bearing assembly 10 includes a circular array of support rollers with support race and cage, all generally designated as support row assembly 20. The circular array of support rollers are radially aligned about the turret for supporting the turret weight. Any uplifting turret force is resisted by a second set of radially aligned rollers with uplift race and cage, all generally designated as uplift row assembly 40. A third set of rollers with radial race and cage or spacers, all generally designated as radial row assembly 60, coaxially aligned about the turret, serve to transfer radial loads between the vessel and the turret. The third set of rollers for transferring the radial load typically have spacers between the rollers. However, sometimes the bearings are designed full complement, meaning there are no radial cages or spacers and just rollers.

The lower support row assembly 20 is the most loaded when a downwardly acting axial force is applied. Of the three rows of roller bearings, the bearing support rollers and races of the support row assembly 20 typically receive the most load and are the most likely to sustain damage in medium to deep water systems. For shallow water systems, the radial load can be quite high and the vertical load nominal. Thus, in shallow water systems, the bearing radial rollers and races 60 may be the most loaded and the most likely to sustain damage. The preferred embodiments primarily address remediation or replacement of the support race and rollers 20.

The bearing race provides a path on which the rollers roll. To realize the longest service life, the roller path of the bearing race needs to be as flat and circular as possible allowing for a smooth load distribution upon the rollers themselves.

Referring to FIG. 1, a bearing inner ring 30 is secured to the turret structure 12 via a plurality of circumferentially-spaced inner ring fasteners, preferably threaded stud bolts 32, washers 36, and nuts 34. A bearing outer upper ring 42 and outer lower ring 22 are secured to the turret supporting structure 14 of the floating vessel via a plurality of circumferentially-spaced outer ring fasteners, preferably threaded stud bolts 46 and nuts 44.

Figure 2:
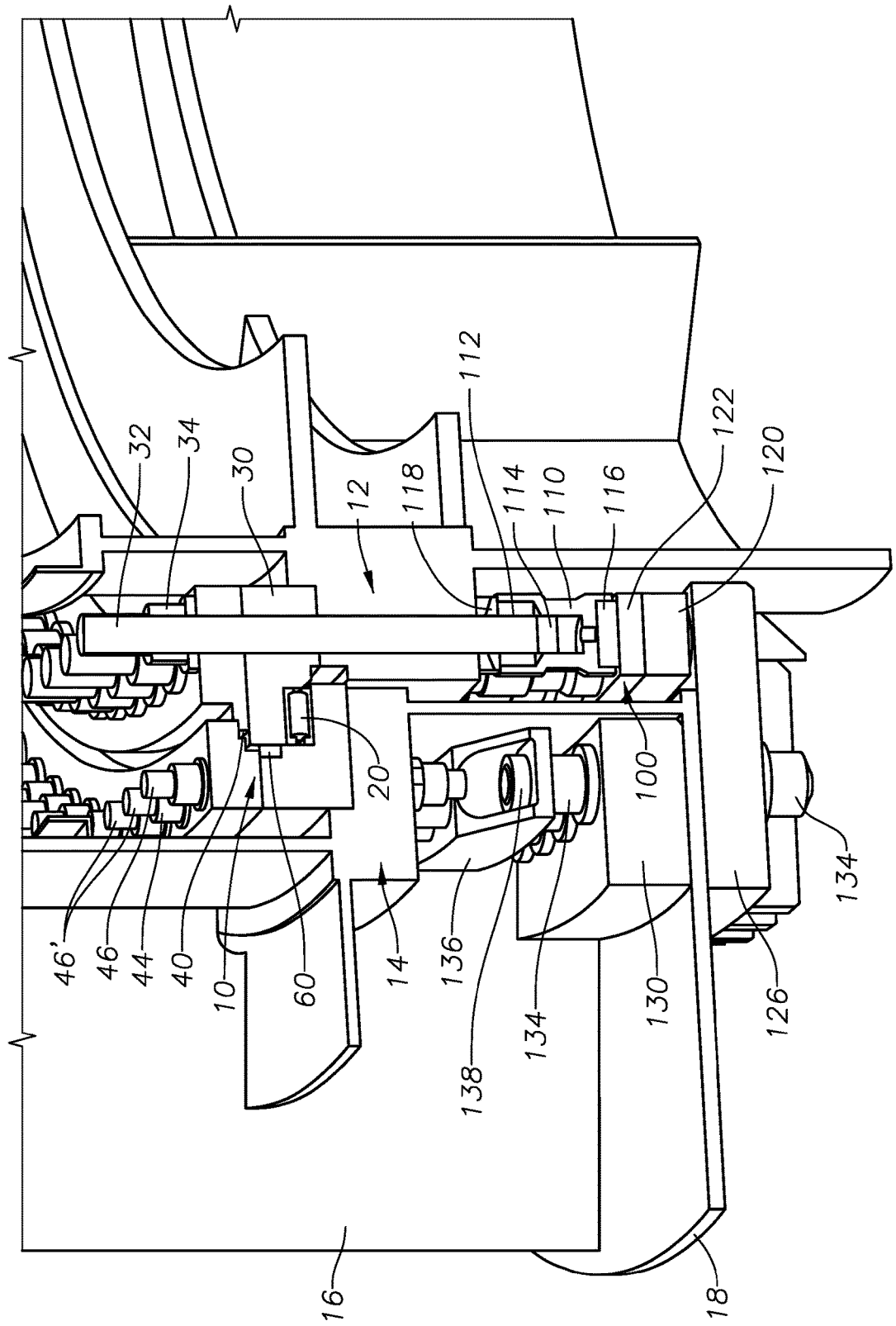
FIGS. 2 and 3 are partial perspective views in cross-section of a three-row roller bearing assembly arrangement repaired with a plain bearing according to a preferred embodiment of the present invention, the figures also showing portions of the vessel supporting structure and turret structure.
Figure 3:
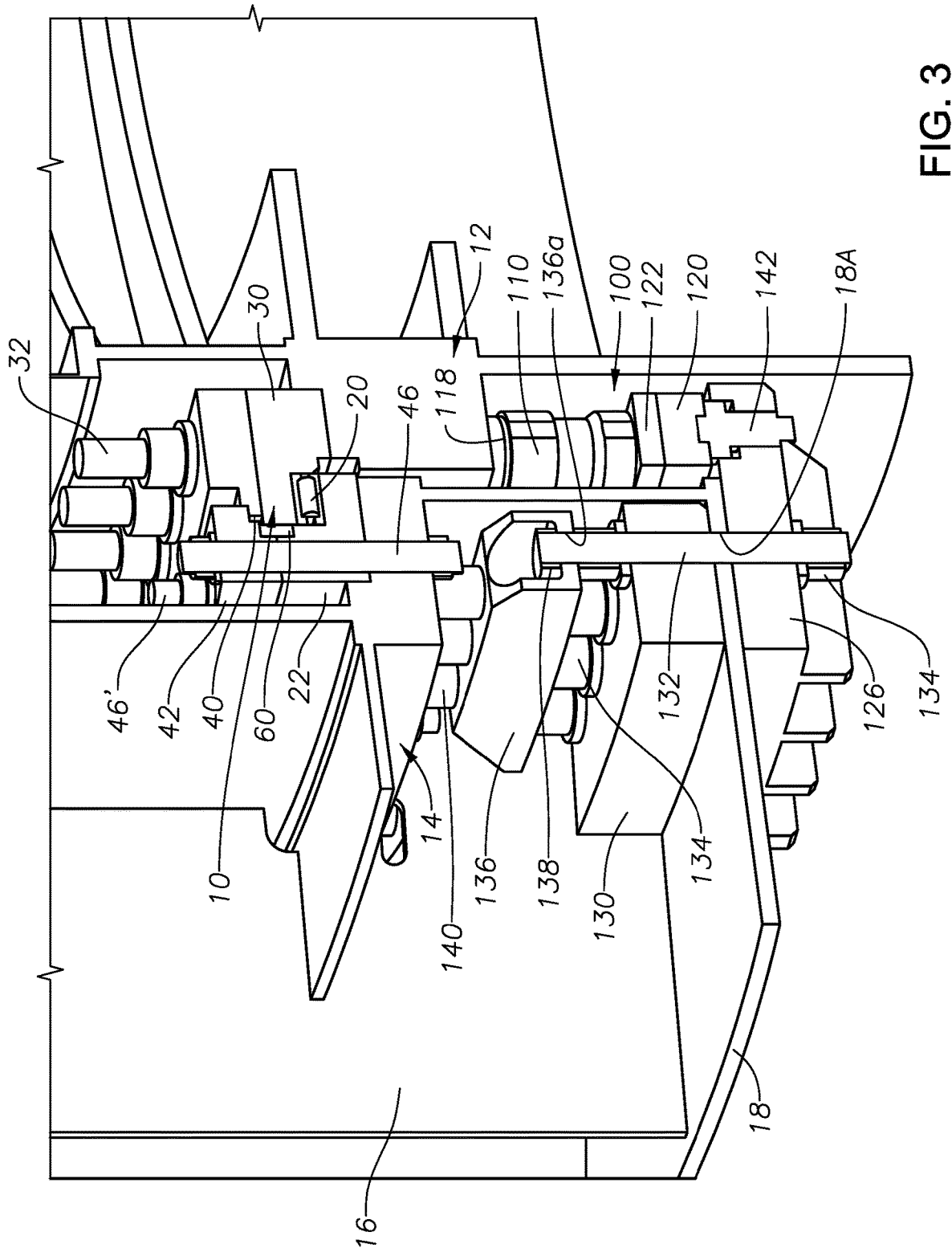
Figure 4:
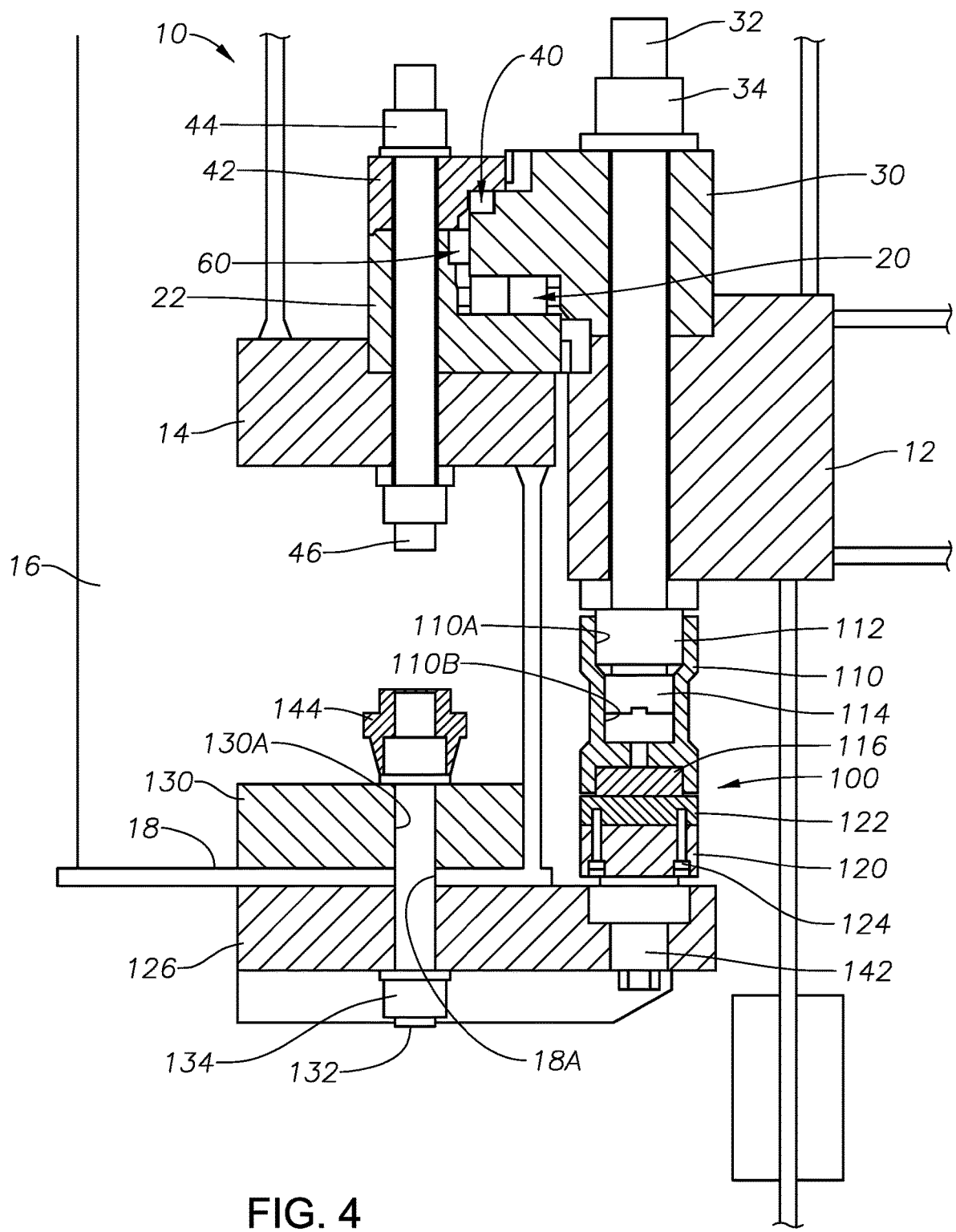
FIG. 4 is a partial elevation view in cross-section of the repaired three-row roller bearing assembly arrangement according to the embodiment shown in FIGS. 2 and 3 without the use of a spreader bar.
Figure 5:
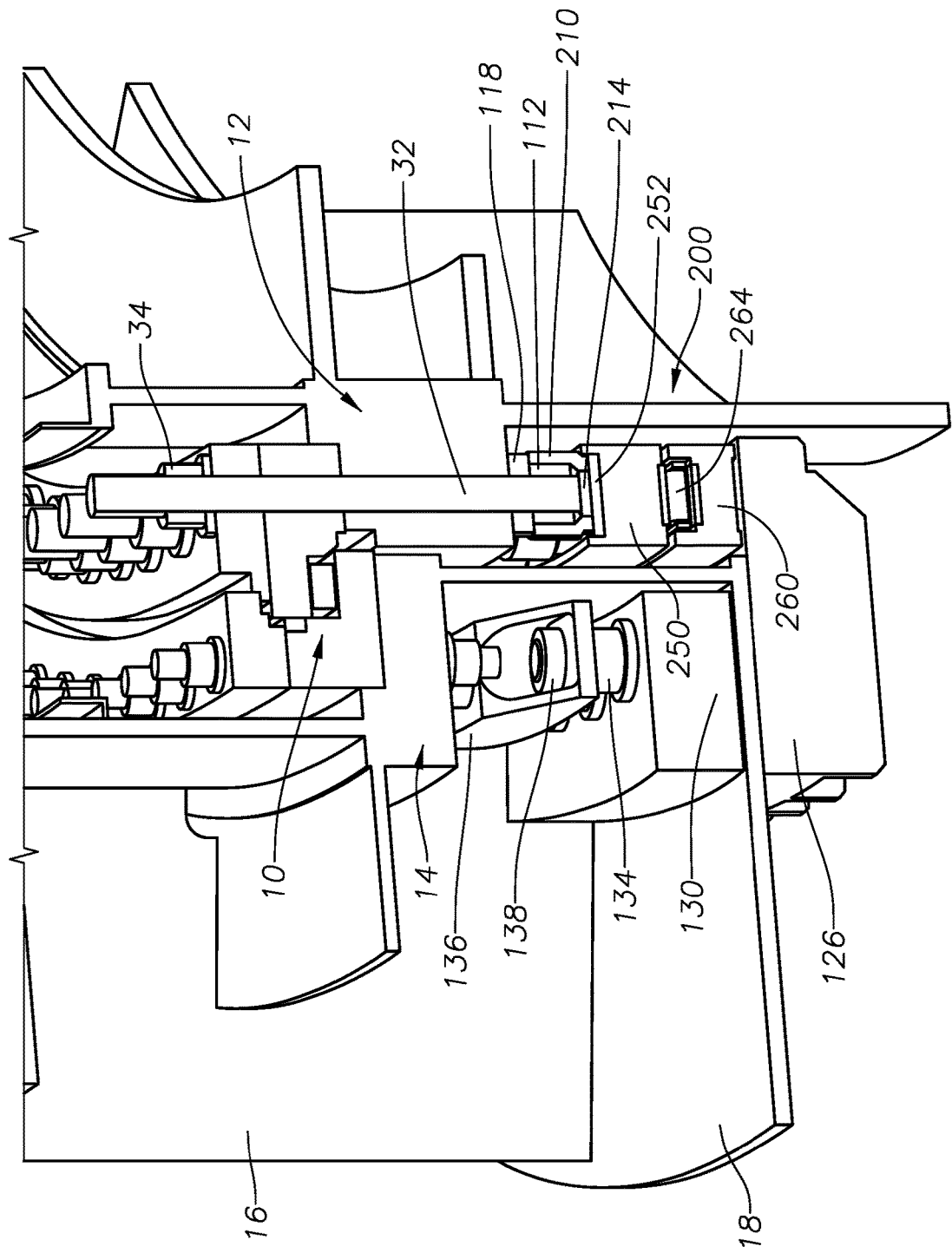
FIGS. 5 and 6 are partial perspective views in cross-section of a three-row roller bearing assembly arrangement repaired with a roller bearing according to a second preferred embodiment of the present invention, the figures also showing portions of the vessel supporting structure and turret structure.
Figure 6:
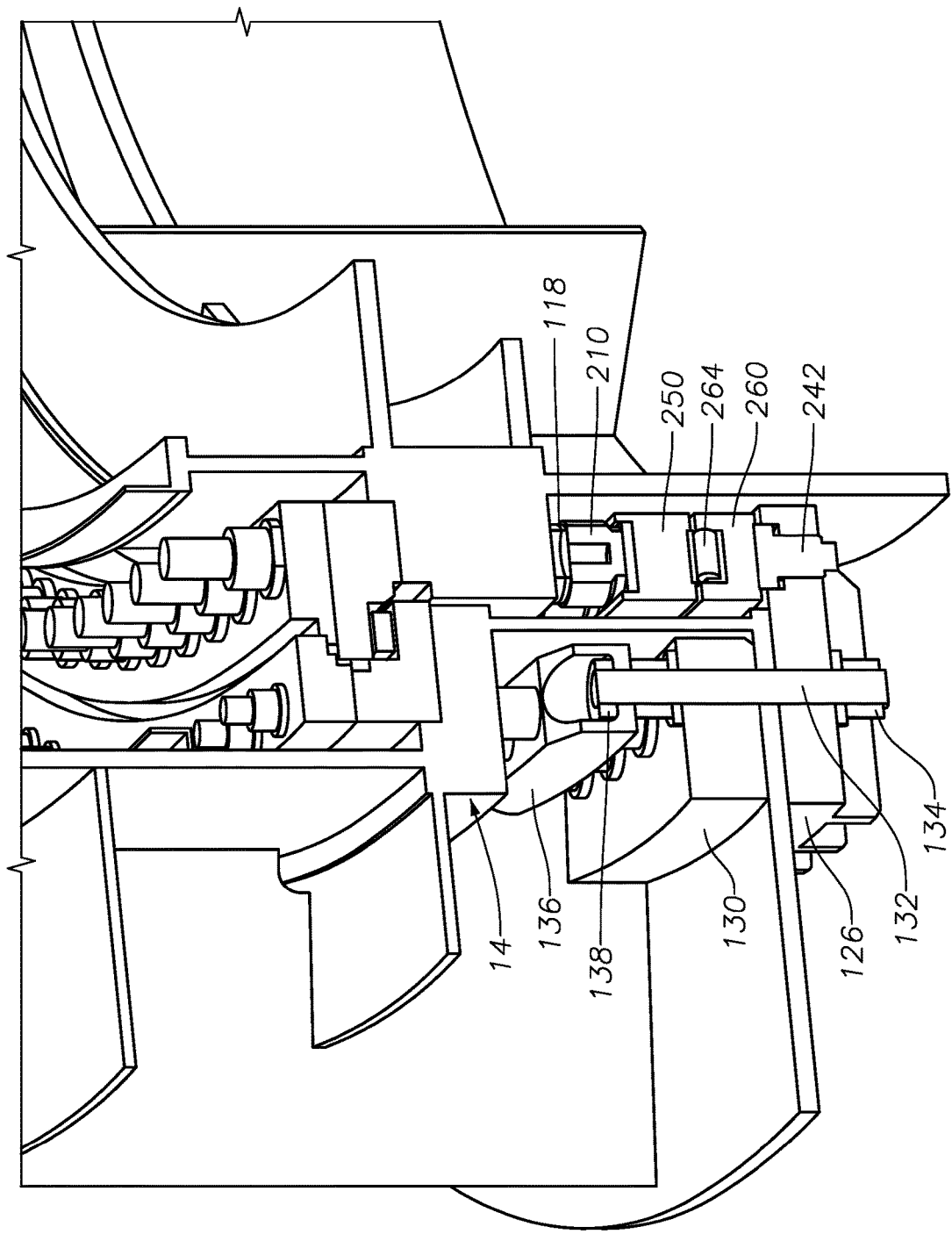
Figure 7:
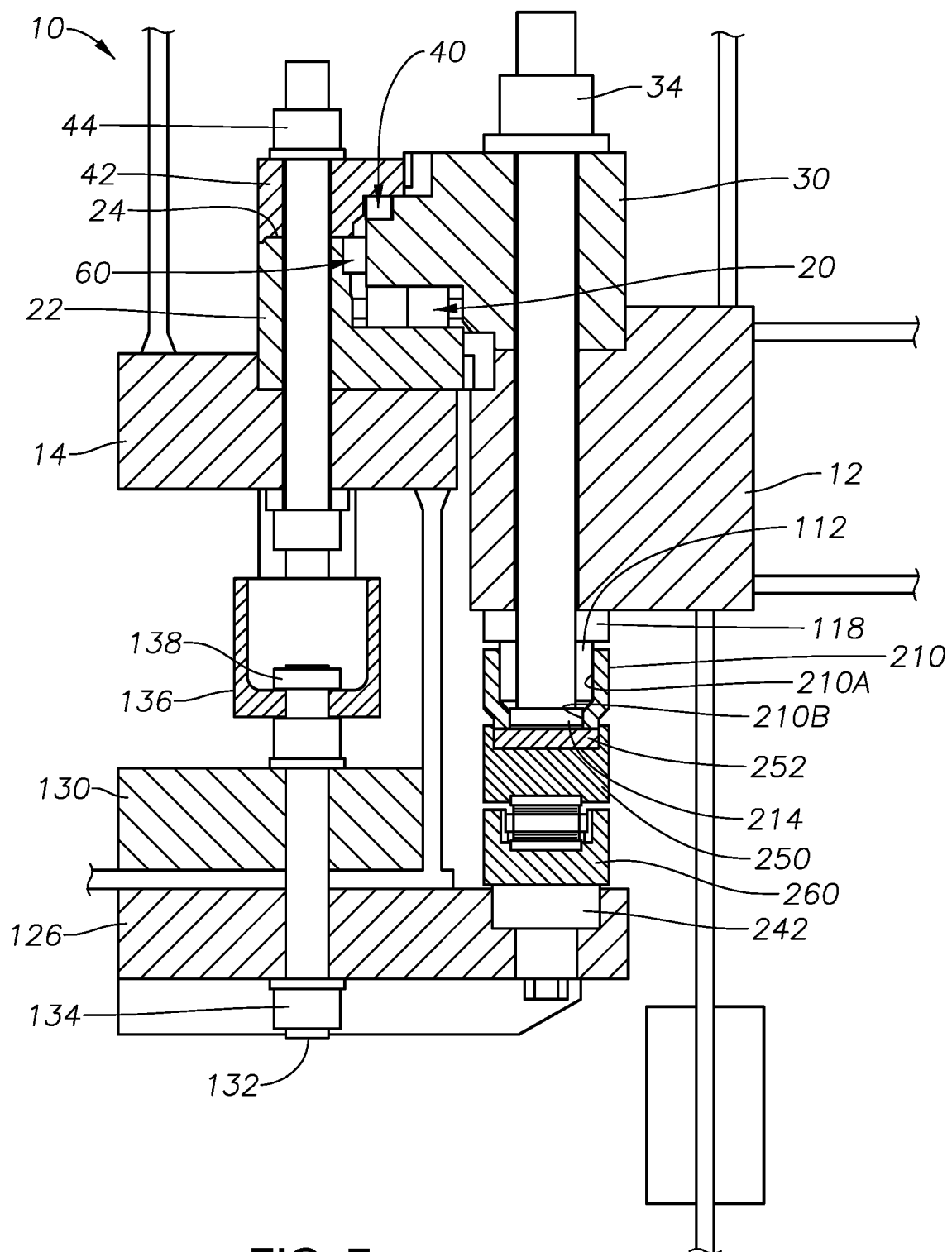
FIG. 7 is a partial elevation view in cross-section of the repaired three-row roller bearing assembly arrangement according to the embodiment shown in FIGS. 5 and 6.

The preferred embodiments of the present invention address the in situ repair or remediation of a three-row roller bearing assembly 10 in which the support row assembly 20 is damaged. The preferred embodiments have a goal of in situ repair or remediation while allowing the vessel to continue to weather vane in either a free-state or with assistance. The preferred embodiments employ either rolling elements or self-lubricating sliding bearing pads (i.e., plain bearings) to remove the axial load from the main support row assembly 20. In the preferred embodiments, the axial load is taken underneath the existing bearing assembly 10 from the bearing inner ring 30 to the outer turret supporting structure 14. The axial load is preferably transferred or re-routed from the damaged support row assembly 20 of the existing three row roller bearing assembly 10 to a new support bearing assembly (i.e., either a plain bearing assembly 100 as shown in FIGS. 2-4 or a support roller bearing assembly 200 as shown in FIGS. 5-7) with jack screws or hydraulic jacks as discussed below. Radial load will continue to be transferred through the existing main bearing assembly 10.

In one preferred embodiment, the plain bearing assembly 100 is installed beneath the existing main bearing assembly 10 as shown in FIGS. 2-4. Upon installation of the plain bearing assembly 100, the plain bearing assembly 100 removes the vertical and moment load off the existing support row assembly 20 while the radial load path remains through the radial row assembly 60 of the existing main bearing assembly 10. Uplift rollers in the uplift row assembly 40 of the existing main bearing assembly 10 remain available for potential uplift or overturning moments.

This embodiment reacts vertical load from the turret structure 12 of the turret into the turret supporting structure 14 of the vessel through the plurality of existing inner ring stud bolts 32 of the bearing inner ring 30 as shown in FIGS. 2-4. A spherical washer 118 and a special nut 112, preferably externally and internally threaded, replaces the existing washer 36 and lower nut 34 on the inner ring stud bolts 32. A coupler 110 is threaded onto the special nut 112 at the lower end of the existing inner ring stud bolt 32. A bearing disk 116 is inserted into the lower portion of each coupler 110 as shown in FIGS. 2 and 4. Preferably, the bearing disks 116 are made of a self-lubricated, composite material. A set screw 114 locks each coupler 110 to the existing inner ring stud bolt 32. The height of the coupler 110 with bearing disk 116 is set to form a flat planar lower bearing surface for even load distribution.

A continuous bearing ring 120 is preferably formed by a plurality of bearing ring segments. A sliding surface 122, preferably of stainless steel, is placed on an upper portion of the bearing ring 120 and positioned between the coupler bearing disks 116 and the bearing ring 120. The sliding surface 122 may be fastened securely to the bearing ring 120, as for example, by bolts 124 as shown in FIG. 4. Preferably, the stainless sliding surface 122 is segmented and forms a continuous ring that is alternatingly segmented with the segmented bearing ring 120. The bearing disks 116 of the couplers 110 are arranged and designed to slide on the stainless sliding surface 122 on the bearing ring 120 upon completion of the turret bearing remediation process.

Preferably, a plurality of reaction plates 126 and a plurality of support plates 130 are fastened to the turret head supporting structure 14 of the vessel. Typically, the number of reaction plates 126 and the number of support plates 130 matches the number of radial stiffeners 16, as for example twenty-four (24). A plurality of holes 18A are drilled in a bottom plate 18 below the turret head supporting structure 14. Preferably, the holes 18A are axially aligned with the holes for the outer ring stud bolts 46. The holes 18A allow the mounting of the support plates 130 to an upper surface of the bottom plate 18 and the reaction plates 126 to a lower surface of the bottom plate 18 with new large stud bolts 132 extending through aligned holes in the support plates 130, reaction plates 126 and bottom plate 18. After installing nuts 134, the new large stud bolts 132 are tensioned, preferably hydraulically with hydraulic tensioner 144 (FIG. 4).

A plurality of spreader bars 136, preferably the same in number as the plurality of support plates 130, may be installed to further support the axial load of the turret structure 12. Each spreader bar 136 may be positioned directly above a support plate 130. Preferably, the spreader bar 136 is connected with a nut 138 to an upper end of the two outermost new large stud bolts 132 connecting the support plate 130 to the bottom plate 18 as shown in FIGS. 2 and 3. The spreader bar 136 is attached to the turret head support structure 14 by replacing the existing outer ring studs 46, located above and between the axially aligned two outermost new large stud bolts 132, with new longer outer ring studs 46' (FIG. 2) threaded into the spreader bar 136. Referring to FIG. 3, spacers 140 allow the new longer outer ring studs 46' to be tensioned without over loading the structure. This arrangement forms a stiff load reacting assembly attached to the existing structure.

A plurality of jack screws 142 are installed in the reaction plates 126 below and in contact with the continuous bearing ring 120 as shown in FIGS. 3 and 4. The plain bearing assembly 100 is loaded by turning a plurality of jack screws 142 with a hydraulic torque wrench to a specified height to lift the turret structure 12 and form a flat surface for bearing support.

A preferred method of installing the plain bearing assembly 100 in situ will now be described. The plurality of holes 18A are drilled through the bottom plate 18 of the turret supporting structure 14 around its circumference. The holes 18A are preferably substantially aligned with the outer ring stud bolts 46. The inner ring stud bolts 32 are de-tensioned one at a time and the washers 36 and lower nuts 34 replaced with the spherical washers 118 and new special nuts 112. The special nuts 112 are preferably internally and externally threaded. The inner ring stud bolts 32 are re-tensioned such that a predetermined length protrudes below the lower special nuts 112. For example, 10 millimeters of the inner ring stud bolt 32 may protrude below the special nut 112. Referring to FIG. 4, an upper portion 110A of each coupler 110 is internally threaded, allowing the couplers 110 to be threadably installed onto the lower special nuts 112. The couplers 110 are all positioned to the same elevation, preferably by laser measurement. A set screw 114 threadably engaging a threaded lower portion 110B of the coupler 110 is tightened against the bottom of the inner ring stud bolt 32 to maintain the proper elevation of the couplers 110. The self-lubricated, composite material bearing disks 116 are installed in the lower end of the couplers 110.

In the preferred embodiment, the reaction plates 126, support plates 130 and spreader bars 136 are in sections sized to be aligned and cooperate with five adjacent outer ring stud bolts 46. For each section, the existing inner three outer ring stud bolts 46 are removed. The plurality of support plates 130 are positioned onto the upper surface of the bottom plate 18 with five new large stud bolts 132 received in holes 130A extending through each support plate 130. Nuts 134 are attached to the upper end of the stud bolts 132.

The segments of the continuous bearing ring 120 and the continuous stainless sliding surface 122 are assembled together forming a continuous ring around the circumference of the turret. Preferably, the continuous bearing ring 120 with sliding surface 122 are supported, temporarily on a stand, below the couplers 110.

Individual reaction plates 126, preferably with the jack screws 142 installed, are positioned below the bottom plate 18 in alignment with a corresponding support plate 130. The five new large stud bolts 132 in the corresponding support plate 130 are lowered through the bottom plate holes 18A and through corresponding holes 126A in the reaction plate 126. Lower nuts 134 are installed on the lower end of the large stud bolts 132 and the stud bolts 132 are tensioned. Preferably, a predetermined length of the large stud bolts 132 protrudes below the lower nuts 134. Once enough reaction plates 126 are installed to support the continuous bearing ring 120, the support stands can be removed. The remaining reaction plates 126 may then be installed.

The spreader bars 136 are installed by lowering the spreader bar 136 over the upper ends of the five large stud bolts 132 such that the outer large stud bolt 132 at each end extends through an outer lower hole 136A at each end of the spreader bar 136. A nut 138 is threaded onto the protruding upper end of the outer large stud bolt 132 and tensioned to secure the spreader bar 136 to the lower reaction plate 126. The three new longer outer ring studs 46' are inserted through the outer upper ring 42, outer lower ring 22, turret supporting structure 14, and a spacer 140 before being threaded into a threaded opening of the spreader bar 136. Referring to FIG. 3, spacers 140 allow the new longer outer ring studs 46' to be tensioned without over loading the structure. This arrangement forms a stiff load reacting assembly attached to the existing structure. The jacking screws 142 are then used to align the continuous stainless steel sliding surface 122 with the bearing disks 116. The plain bearing assembly 100 is loaded by turning the plurality of jack screws 142 with a hydraulic torque wrench to a specified height to lift the turret structure 12 and form a flat surface for bearing support. The turret structure 12 is raised to remove the vertical load from the damaged original support row assembly 20.

The above-described embodiment of the plain bearing assembly 100 installed below the existing bearing assembly 10 provides the following benefits and characteristics:

uses existing inner ring bolting 32 to react load below existing bearing assembly 10;

minimizes hot work (e.g., welding or flame cutting);

uses short lead time materials;

utilizes self-lubricating composite bearing material used on many applications;

deflections and tolerances are less of an issue with compliant bearing material;

higher levels of breakout torque required to rotate the chaintable (i.e., turret structure 12);

uses jacking screws 142 to lift the chaintable 12 to original position; and radial load path remains through the radial row assembly 60 of the existing bearing assembly 10.

A second preferred embodiment comprises installing a support roller bearing assembly 200 in situ underneath the existing main bearing 10 as shown in FIGS. 5-7. The support roller bearing assembly 200 solution shares many of the same components as the plain bearing assembly 100 solution so that the planning of both embodiments is available to maximize uptime of the floating vessel, typically a floating production storage and offloading unit (FPSO). The support roller bearing assembly 200 solution also removes the vertical and moment load off the existing main bearing 10 while the radial load path remains through the radial row assembly 60 of the existing main bearing 10. The uplift row assembly 40 in the existing main bearing 10 remains available for potential uplift or overturning moments. With the use of rollers, the second preferred embodiment remains a low torque solution similar to the original design.

As with the plain bearing assembly 100, this embodiment reacts vertical load from the turret structure 12 into the existing inner ring stud bolt 32 assembly and into the turret supporting structure 14 of the vessel. A spherical washer 118 and a special nut 112, preferably externally and internally threaded, replaces the existing washer 36 and lower nut 34 on the inner ring stud bolts 32. A coupler 210 is threaded onto the special nut 112 at the lower end of the existing inner ring stud bolt 32. A set screw 214 locks each coupler 210 to the existing inner ring stud bolt 32. The height of the coupler 210 is set to form a flat planar bearing surface for even load distribution.

An upper bearing ring 250 is preferably formed by a plurality of upper bearing ring segments. A self-lubricated composite bearing material ring 252 is placed into an upper portion of the upper bearing ring 250 to absorb minute deviations in the height of the couplers 210. The upper bearing ring 250 is segmented to form a continuous ring. Preferably, the bearing material ring 252 is segmented and forms a continuous ring that is alternatingly segmented with the segmented upper bearing ring 250.

A continuous lower bearing ring 260 is preferably formed by a plurality of lower bearing ring segments. Hardened and ground steel races 262 are placed in recesses of the upper bearing ring 250 and the lower bearing ring 260 to provide the rolling element surface for new rollers 264 separated by cages 266. The lower bearing ring 260 is supported by a plurality of jack screws 242 mounted in the reaction plates 126.

Figure 8:
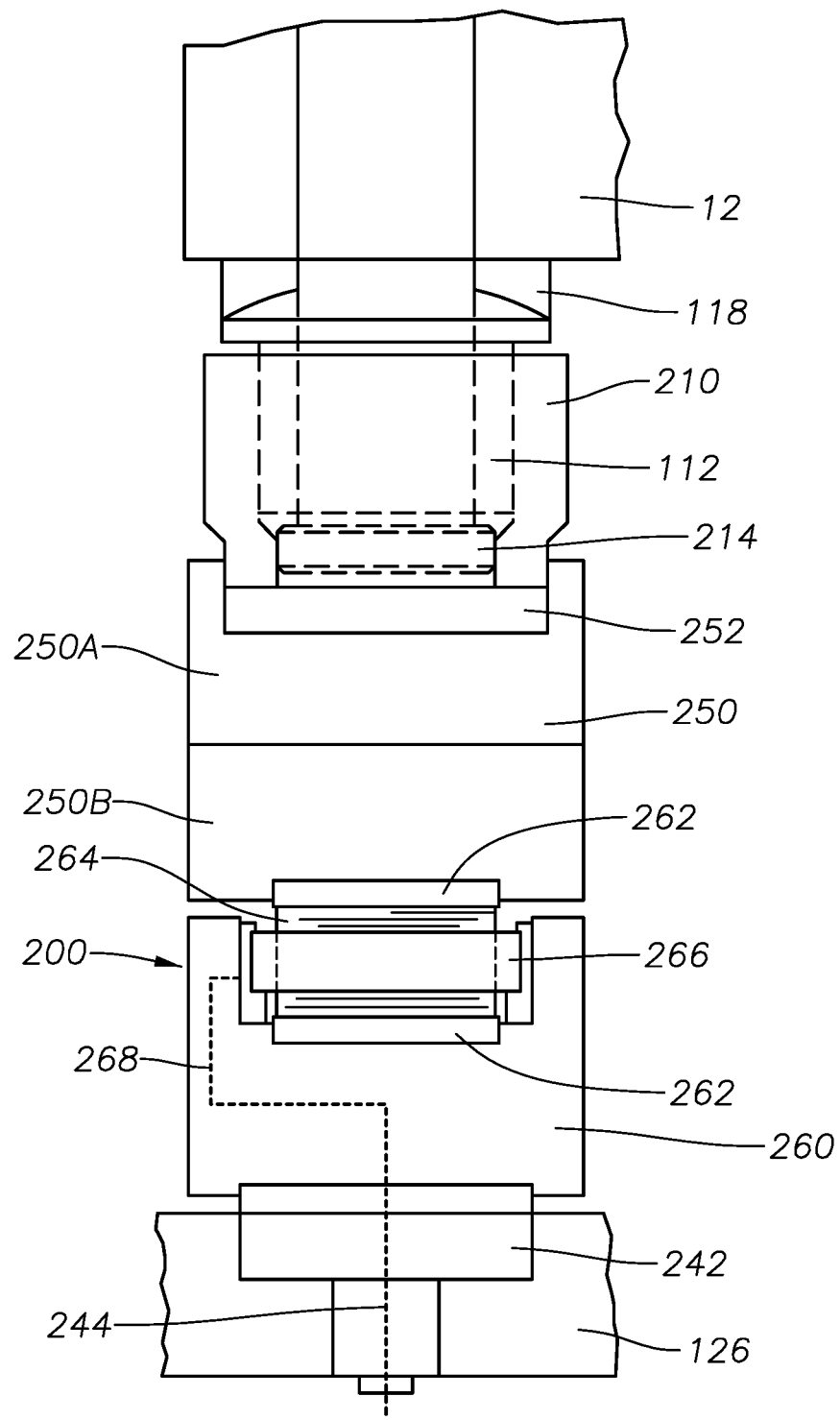
FIG. 8 is an enlarged partial elevation view of the support roller bearing assembly according to the second preferred embodiment.

On the turret supporting structure 14 of the vessel side, all of the assembly is identical to the plain bearing assembly 100 embodiment described above with respect to FIGS. 2-4, with the exception of the jack screws 242 which differ slightly. As shown in FIG. 8, preferably a port 244 in the jack screws 242 is in fluid communication with ports 268 in the lower bearing ring 260 to provide lubrication to the steel races 262, rollers 264 and cages 266 of the support roller bearing assembly 200. The stiffening assembly comprising the reaction plates 126, support plates 130 and spreader bars 136 fastened to the existing turret supporting structure 14 provides ample support for the rolling elements and minimizes deflections under load.

This new support roller bearing assembly 200 is also loaded by turning the plurality of jack screws 242 with a hydraulic torque wrench to a specified height to lift the turret structure 12 and form a flat surface for bearing support.

The preferred method of installing the support roller bearing assembly 200 in situ is performed in a similar manner as the plain bearing assembly 100. The plurality of holes 18A are drilled through the bottom plate 18 of the turret supporting structure 14 around its circumference in the same manner as above. The inner ring stud bolts 32 are de-tensioned one at a time and the washers 36 and lower nuts 34 replaced with the spherical washers 118 and special nuts 112. The inner ring stud bolts 32 are re-tensioned such that a predetermined length protrudes below the lower special nuts 112. For example, 10 millimeters of the inner ring stud bolt 32 may protrude below the special nut 112. An upper portion 210A of each coupler 210 is internally threaded, allowing the couplers 210 to be threadably installed onto the lower special nuts 112. The couplers 210 are all positioned to the same elevation, preferably by laser measurement. A set screw 214 threadably engaging a threaded lower portion 210B of the coupler 210 is tightened against the bottom of the inner ring stud bolt 32 to maintain the proper elevation of the couplers 210. The height of the coupler 210 is set to form a flat planar bearing surface for even load distribution.

In the preferred embodiment, the reaction plates 126, support plates 130 and spreader bars 136 are in sections sized to be aligned and cooperate with five adjacent outer ring stud bolts 46. For each section, the existing inner three outer ring stud bolts 46 are removed. The plurality of support plates 130 are each positioned onto the upper surface of the bottom plate 18 with five new large stud bolts 132 received in holes 130A extending through each support plate 130. Nuts 134 are attached to the upper end of the stud bolts 132.

The segments of the continuous lower bearing ring 260 are joined together and the hardened and ground steel race segments 262 are installed in the upper recess of the continuous lower bearing ring 260. The steel race segments 262 are alternatingly segmented with the lower bearing ring segments 260. The continuous lower bearing ring 260 with continuous steel race 262 are assembled forming a continuous ring around the circumference of the turret.

The segments of the continuous upper bearing ring 250 are joined together and the self-lubricated composite bearing material ring segments 252 are placed into the upper portion of the upper bearing ring 250. The bearing material ring segments 252 are alternatingly segmented with the upper bearing ring segments 250. The hardened and ground steel race segments 262 are installed in the lower recess of the continuous upper bearing ring 250. The steel race segments 262 are alternatingly segmented with the upper bearing ring segments 250. In a preferred embodiment, the upper bearing ring 250 comprises top upper bearing segments 250A and bottom upper bearing ring segments 250B which are alternatingly segmented and fastened together to form the continuous upper bearing ring 250.

Referring to FIG. 8, the new support rollers 264 and cages 266 are installed between the upper and lower support races 262 in the lower and upper recesses of the upper bearing ring 250 and the lower bearing ring 260. Preferably, the assembled upper and lower bearing rings 250 and 260 with the support rollers 264, cage 266 and races 262 are supported, temporarily on a stand, below the couplers 210.

Individual reaction plates 126, preferably with the jack screws 242 installed, are positioned below the bottom plate 18 in alignment with a corresponding support plate 130. The five new large stud bolts 132 in the corresponding support plate 130 are lowered through the bottom plate holes 18A and through corresponding holes 126A in the reaction plate 126. Lower nuts 134 are installed on the lower end of the large stud bolts 132 and the stud bolts 132 are tensioned. Preferably, a predetermined length of the large stud bolts 132 protrudes below the lower nuts 134. Once enough reaction plates 126 are installed to support the assembled upper and lower bearing rings 250 and 260 with the support rollers 264, cage 266 and races 262, the support stands can be removed. The remaining reaction plates 126 may then be installed.

The spreader bars 136 are installed by lowering the spreader bar 136 over the upper ends of the five large stud bolts 132 such that the outer large stud bolt 132 at each end extends through an outer lower hole 136A at each end of the spreader bar 136. A nut 138 is threaded onto the protruding upper end of the outer large stud bolt 132 and tensioned to secure the spreader bar 136 to the lower reaction plate 126. The three new longer outer ring studs 46' are inserted through the outer upper ring 42, outer lower ring 22, turret supporting structure 14, and a spacer 140 before being threaded into a threaded opening of the spreader bar 136. The spacers 140 allow the new longer outer ring studs 46' to be tensioned without over loading the structure. This arrangement forms a stiff load reacting assembly attached to the existing structure. The jacking screws 242 are then used to align the upper bearing material ring 252 of the upper bearing ring 250 with the couplers 210. The support roller bearing assembly 200 is loaded by turning the plurality of jack screws 242 with a hydraulic torque wrench to a specified height to lift the turret structure 12 and form a flat surface for bearing support. The turret structure 12 is raised to remove the vertical load from the damaged original support row assembly 20.

The embodiment of the support roller bearing assembly 200 installed below the existing bearing assembly 10 provides the following benefits and characteristics:

uses existing inner race bolting 32 to react load below existing bearing assembly 10;

minimizes hot work;

uses short lead time materials with the exception of possibly the rollers 264 and hardened races 262;

utilizes rollers 264 riding on hardened races 262 similar to those used in segmented bearings;

deflections and tolerances which are more of an issue for roller loading is aided by the bearing material ring 252;

low level of breakout torque required to rotate the chaintable (i.e., turret structure 12);

uses jacking screws 242 to lift the chaintable 12 to original position; and radial load path remains through the radial row assembly 60 of the existing bearing assembly 10.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

What is claimed is:

1. A deployable assembly for in-situ remediation of a support row assembly supporting an axial load of a turret on a turret supporting structure of a floating vessel, wherein the support row assembly comprises damaged support row rollers and/or a damaged support race disposed between an inner ring connected to the turret and an outer ring connected to the floating vessel, the deployable assembly comprising:

a support bearing assembly comprising an upper bearing surface, a lower bearing surface, and a plurality of bearings, wherein:

the lower bearing surface is an upper surface of a first bearing ring, the upper bearing surface is a lower surface of a second bearing ring, the first and second bearing rings are configured to be located around a circumference of the turret, each bearing in the plurality of bearings is configured to be disposed between the upper bearing surface and the lower bearing surface and to move on the lower bearing surface or the upper bearing surface, and upon installation of the support bearing assembly, the axial load is supported by the first bearing ring, the plurality of bearings, the second bearing ring, and the inner ring instead of the inner ring, the outer ring, and the damaged support row rollers and/or the damaged support race in the support row assembly.

2. The deployable assembly of claim 1, wherein each bearing in the plurality of bearings is configured to move on the lower bearing surface.

3. The deployable assembly of claim 1, wherein each bearing in the plurality of bearings is a bearing pad configured to slide on the lower bearing surface or the upper bearing surface.

4. The deployable assembly of claim 1, wherein each bearing in the plurality of bearings is a roller bearing configured to roll on the lower bearing surface and the upper bearing surface.

5. The deployable assembly of claim 1, wherein the support bearing assembly further comprises a plurality of reaction plates, and wherein the plurality of reaction plates is configured to support the axial load upon installation of the support bearing assembly.

6. The deployable assembly of claim 1, wherein:

the inner ring is secured to the turret by a plurality of inner ring fasteners, and the outer ring is secured to the vessel by a plurality of outer ring fasteners.

7. The deployable assembly of claim 6, wherein the support bearing assembly is configured to couple to one or more of the plurality of inner ring fasteners.

8. The deployable assembly of claim 6, wherein the support bearing assembly is configured to support the axial load through one or more of the plurality of inner ring fasteners.

9. The deployable assembly of claim 1, further comprising a plurality of jack screws configured to move the turret such that the axial load is removed from the support row assembly and transferred to the support bearing assembly.

10. The deployable assembly of claim 1, wherein the support row assembly is a component of a roller bearing assembly, wherein the roller bearing assembly further comprises an uplift row assembly comprising rollers that resist uplifting or overturning moments of the turret, and wherein the support bearing assembly is configured to allow the rollers in the uplift row assembly to remain in place during installation of the support bearing assembly.

11. A deployable assembly for in-situ remediation of a support row assembly supporting an axial load of a turret on a turret supporting structure of a floating vessel, wherein the support row assembly comprises damaged support row rollers and/or a damaged support race disposed between an inner ring connected to the turret and an outer ring connected to the vessel, the deployable assembly comprising:

a support bearing assembly comprising a plurality of couplers, a plurality of reaction plates, and a plurality of bearings, wherein:

each bearing in the plurality of bearings is a bearing pad or a roller bearing, the plurality of reaction plates and the plurality of couplers are configured to support the plurality of bearings therebetween, and upon installation of the support bearing assembly, the axial load is supported by the plurality of reaction plates, the plurality of couplers, the plurality of bearings, and the inner ring instead of the inner ring, the outer ring, and the damaged support row rollers and/or the damaged support race in the support row assembly.

12. The deployable assembly of claim 11, wherein each coupler in the plurality of couplers is configured to be secured to an inner ring fastener of a plurality of inner ring fasteners, and wherein each inner ring fastener is coupled to the turret.

13. The deployable assembly of claim 12, wherein the support bearing assembly further comprises a bearing ring, wherein:
the bearing ring is configured to be disposed between the plurality of reaction plates and the plurality of couplers, and
each bearing in the plurality of bearings is configured to move on an upper surface of the bearing ring.

14. The deployable assembly of claim 11, wherein the support bearing assembly further comprises a bearing ring configured to be located around a circumference of the turret between the plurality of reaction plates and the plurality of couplers, and wherein each bearing in the plurality of bearings is configured to move on a surface of the bearing ring.

15. The deployable assembly of claim 11, further comprising a plurality of jack screws configured to move the turret such that the axial load is removed from the support row assembly and transferred to the support bearing assembly.

16. A process for remediating a support row assembly supporting an axial load of a turret on a turret supporting structure of a floating vessel, wherein the support row assembly comprises damaged support row rollers and/or a damaged support race disposed between an inner ring connected to the turret and an outer ring connected to the floating vessel, the process comprising:
installing a support bearing assembly around a circumference of the turret, the support bearing assembly comprising an upper bearing surface, a lower bearing surface, and a plurality of bearings disposed between the upper bearing surface and the lower bearing surface, wherein:
the lower bearing surface is an upper surface of a first bearing ring,
the upper bearing surface is a lower surface of a second bearing ring,
each bearing in the plurality of bearings moves on the lower bearing surface or the upper bearing surface; and
transferring the axial load of the turret from the support row assembly to the plurality of bearings upon installation of the support bearing assembly such that the axial load is supported by the first bearing ring, the plurality of bearings, the second bearing ring, and the inner ring instead of the inner ring, the outer ring, and the damaged support row rollers and/or the damaged support race in the support row assembly.

17. The process of claim 16, wherein during installation of the support bearing assembly the first bearing ring is connected to the turret supporting structure of the floating vessel and the second bearing ring is connected to the turret.

18. The process of claim 17, wherein the support row assembly is a component of a roller bearing assembly, wherein the roller bearing assembly further comprises an uplift row assembly comprising rollers that resist uplifting or overturning moments of the turret, and wherein the rollers in the uplift row assembly remain in place during installation of the support bearing assembly.

19. The process of claim 16, wherein each bearing in the plurality of bearings is a bearing pad that slides on the lower bearing surface or the upper bearing surface once the axial load of the turret is transferred from the support row assembly to the plurality of bearings.

20. The process of claim 16, wherein each bearing in the plurality of bearings is a roller bearing that rolls on the lower bearing surface and the upper bearing surface once the axial load of the turret is transferred from the support row assembly to the plurality of bearings.

* * * * *